United States Patent [19]

Duffy

[11] 4,135,436
[45] Jan. 23, 1979

[54] TWO-STAGE FLOW CONTROL VALVE FOR A POWER STEERING SYSTEM

[75] Inventor: James J. Duffy, Livonia, Mich.

[73] Assignee: Ford Motor Co., Dearborn, Mich.

[21] Appl. No.: 821,441

[22] Filed: Aug. 3, 1977

[51] Int. Cl.² ............................................. F15B 11/08
[52] U.S. Cl. ...................................... 91/468; 60/459; 138/45; 180/141
[58] Field of Search .................... 60/387, 459; 91/468, 91/370; 138/45, 46; 180/141, 143

[56] References Cited

U.S. PATENT DOCUMENTS

| | | | |
|---|---|---|---|
| 3,163,006 | 12/1964 | Nuss et al. | 91/468 X |
| 3,349,714 | 10/1967 | Grenier | 417/300 |

Primary Examiner—Edgar W. Geoghegan
Attorney, Agent, or Firm—Donald J. Harrington; Keith L. Zerschling

[57] ABSTRACT

A power steering pump flow and pressure control valve comprising a valve spool located on the high pressure side of the pump and on the upstream side of the vehicle steering gear. The valve includes a spool slidably situated in a valve chamber and a metering pin that is moved relative to the spool to either a first operating position or a second operating position. The metering pin registers with a flow control orifice located at one end of the valve chamber to provide a high flow or a low flow depending upon its operating position.

4 Claims, 3 Drawing Figures

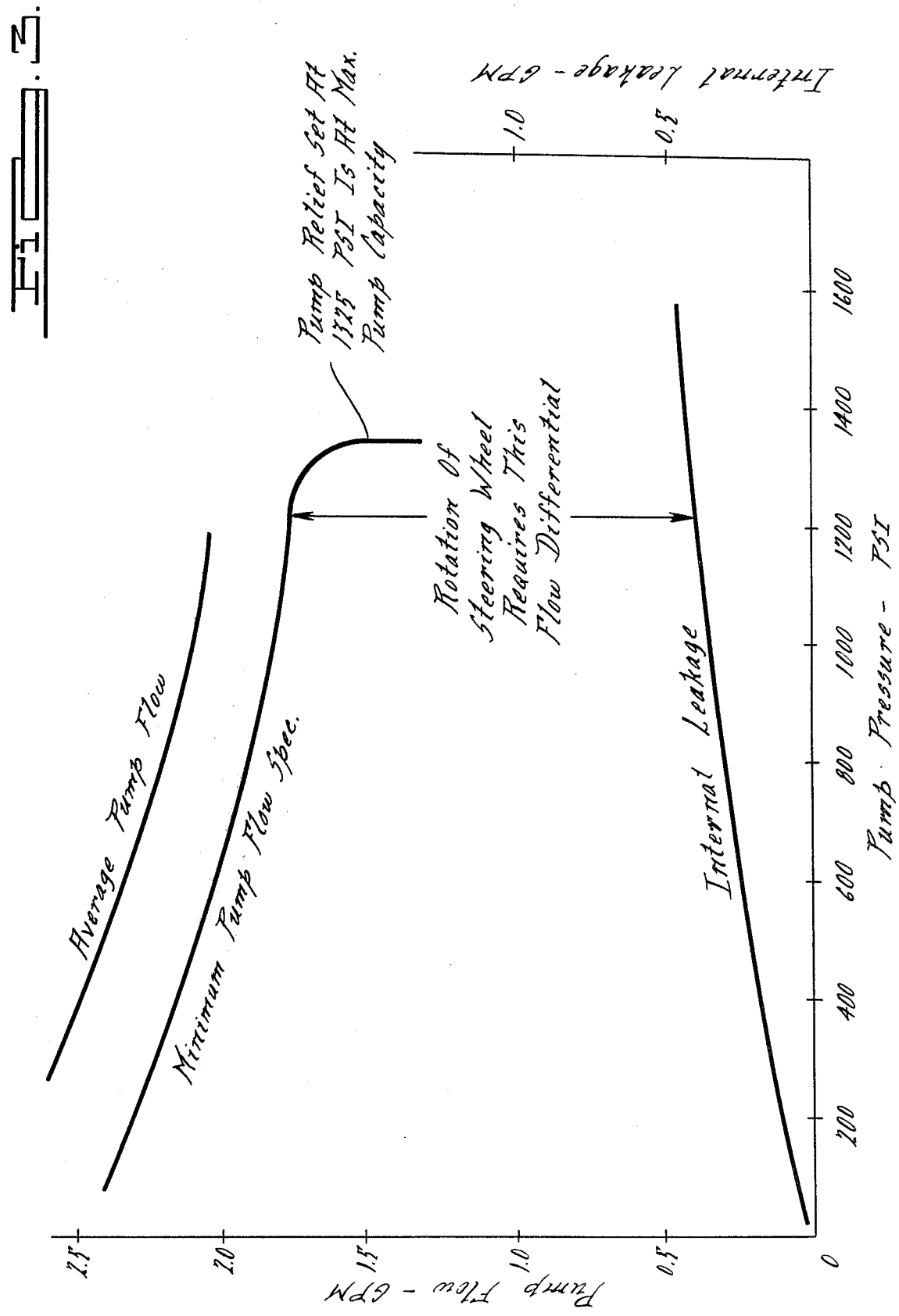

TWO-STAGE FLOW CONTROL VALVE FOR A POWER STEERING SYSTEM

GENERAL DESCRIPTION OF THE INVENTION

The improvements of my invention are adapted to be used in fluid pumps to reduce parasitic horsepower losses in the pump and thereby improve pumping efficiency.

The pump of my invention is part of a power steering system for a wheeled vehicle, and it is driven by the vehicle engine. The horsepower required to drive the pump is proportional to the product of the rate of flow and the delivery pressure of the pump. The displacement of the pump must be great enough to supply both the steering gear leakage and the flow demand of the power steering gear itself during steering maneuvers when the engine operates at low speed.

As the pump speed increases with road speed, the flow delivery increases. But since the horsepower consumption of the pump is proportional to both flow and pressure at the outlet of the pump, a feasible way to reduce the pump free-flow horsepower loss is by reducing the pump discharge pressure. This is in contrast to the concept employed in prior art systems where horsepower loss is reduced by reducing the flow by means of a flow control valve.

This design approach assumes that in a vehicle steering system the requirement for high flow will occur under those conditions that require also high pressure, and that minimum flow is required when the pump pressure requirements are reduced. For example, when a vehicle is steered during parking maneuvers next to a road curb, it is necessary to develop high pump pressures as the operator maneuvers the steering gear with a high steering wheel speed. In contrast, during operation of the vehicle at high speeds on a straight roadway, minimum flow is required because the only steering maneuver the vehicle operator initiates is directional correction. These correctional maneuvers require minimum torque and, therefore, the pressure requirements of the pump are a minimum.

According to my teachings, the discharge pressure of the pump is reduced when high pressures are not required by using a variable orifice at a location between the pump discharge and the steering gear inlet. The variable orifice feature includes an orifice pin that is carried by a flow control valve spool. The position of the pin may be changed relative to the valve spool. The position of the pin may be changed relative to the valve spool in response to changes in the pressure so that when the pressure is increased in response to an increased torque demand, the orifice pin will become adjusted to increase the effective size of the flow control orifice thereby allowing the flow to increase to a higher level during high pressure operation. In contrast, the pressure is reduced when the flow is reduced as the orifice pin returns to a high restriction position relative to the valve spool.

Examples of prior art pressure and flow control regulator valves in a power steering pump are shown in prior art U.S. Pat. Nos. 3,403,630; 3,384,020; 3,349,714; 3,314,395 and 3,752,601. Each of these shows a flow control metering pin with a cooperating control orifice and valve spool. Other valve structures showing various flow and pressure control functions are described in the U.S. Pat. Nos. 2,219,488; 2,665,704; 2,791,229; 3,318,321; 3,462,983 and 2,644,480.

BRIEF DESCRIPTION OF THE FIGURES OF THE DRAWINGS

FIG. 3 is a plot showing the relationship between the pump pressure and the pump flow and between the internal pump leakage and the pump pressure.

PARTICULAR DESCRIPTION OF THE INVENTION

Figure 1:
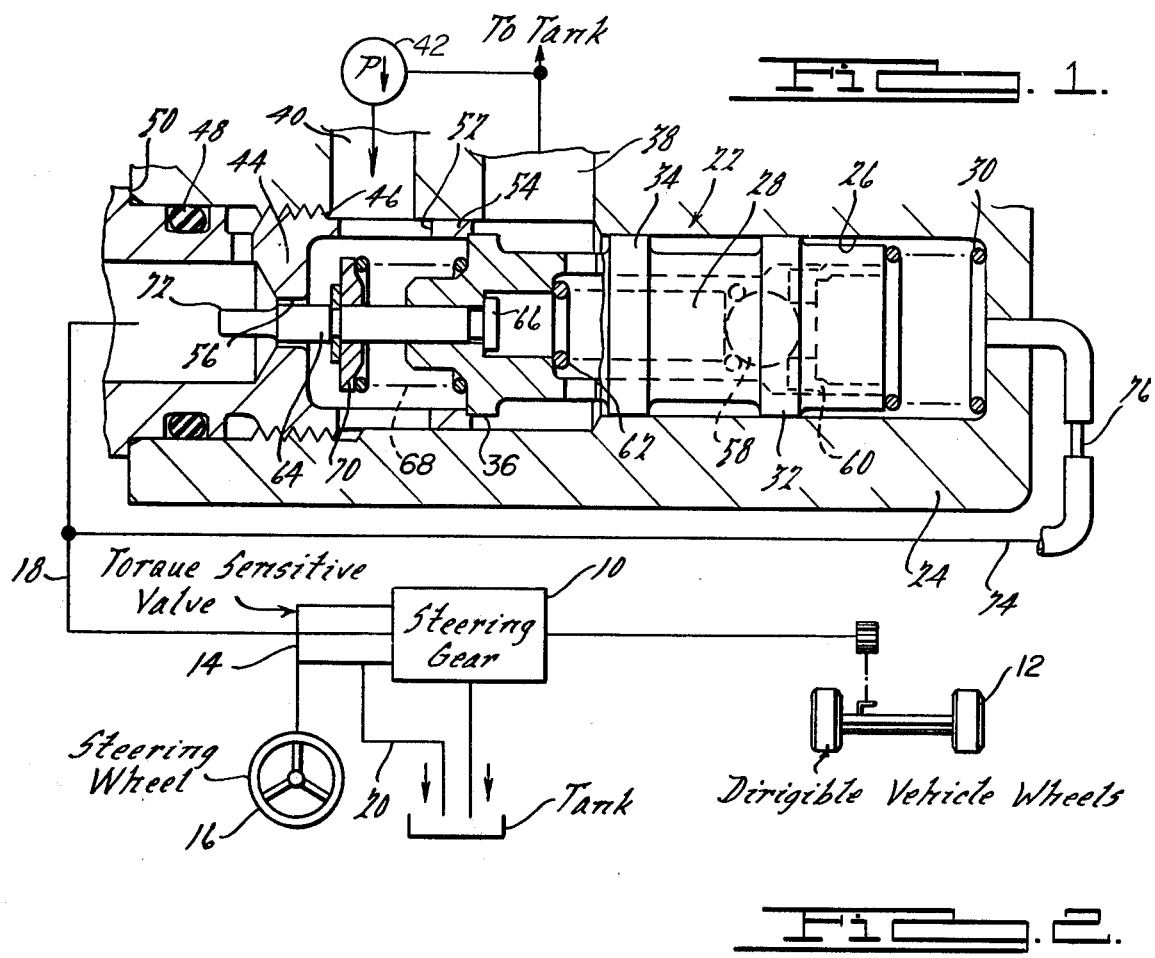
FIG. 1 shows a cross-sectional view of a pressure flow control valve for a power steering system in an automotive vehicle. The system elements apart from the valve are shown in schematic form.

In FIG. 1 reference numeral 10 designates a power steering gear for an automotive vehicle. The gear includes a fluid motor that is connected to the dirigible wheels 12 of an automotive vehicle. During turning maneuvers of the vehicle, the flow requirements of the steering gear are increased. During straight ahead driving, the flow requirements of the steering gear are at a minimum value.

A torque sensitive control valve 14 is connected to steering gear 10 and to driver controlled steering wheel 16. When torque is applied to the wheel 16, relative displacement of the cooperating valve elements of the valve 14 takes place thereby controlling distribution of oil under high pressure from passage 18 to a reservoir or tank, an exhaust passage 20 communicating with the tank.

The control valve assembly of my invention is shown at 22. It includes a valve housing 24 within which is formed a valve chamber 26. Multiple land valve spool 28 is positioned slidably within the valve chamber 26 and it is urged in a left hand direction by valve spring 30. Valve spool 28 includes three spaced valve lands 32, 34 and 36 that slidably register with the inner wall of the valve chamber 26. An exhaust port 38 communicates with the valve chamber 26 at a location intermediate the valve lands 34 and 36. This port communicates with the low pressure pump or tank. High pressure port 40, which communicates with the outlet side of the pump 42, communicates also with the valve chamber 26 at a location on the left hand side of the valve land 36. A cylindrical orifice element 44 is received in the left hand end of the valve chamber 26 and is held in place by external threads 46.

O ring 48 surrounds the orifice element 44 and the stop 50 engages the adjacent wall of the valve housing 24. A port 52 is formed in orifice element extension 54. The end of the extension 54 forms a seat for the valve land 36. Valve land 36 establishes controlled communication between port 40 and port 38.

The orifice element 44 has formed therein a flow control orifice 56 which supplies fluid to delivery passage 18 for the torque sensitive valve, which in turn controls distribution of pressure to the steering gear 10.

Valve spool 28 is hollow and it receives a pressure relief ball valve element 58 which is held against valve seat 60 by valve spring 62. One end of the valve spring 62 is seated on the interior wall of the valve spool 28.

A flow metering pin 64 extends through the orifice 56. It is positioned slidably within a central opening formed in the left hand end of the valve spool 28. A stop 66 establishes the correct operating position for the metering pin. It is urged in a left hand direction by spring 68. Pin 64 carries a spring seat 70 against which the spring 68 is positioned. One end of the spring engages the left hand end of valve spool 28.

The pin 64 is calibrated with two diameters, the smaller of the diameters being located at the tip 72. The pin 64 normally is positioned as shown, and it registers with the orifice to establish a controlled flow to the steering gear under pressures that are lower than a predetermined value. When that value is exceeded the pin 64 retracts into the valve spool 28 thereby causing the smaller diameter tip 72 to register with the orifice 56 thus causing an increased flow to the steering gear. Feedback pressure is distributed to the right hand side of the valve spool 28 through feedback passage 74. A damper in the form of a flow restriction is shown at 76.

High pressure will occur during those operating maneuvers that require high flow, as explained previously. During normal operation, high flow is not required. The pumping horsepower can be reduced by reducing the pressure. This is achieved by the two-stage metering pin which causes a flow restriction of increased magnitude when the pressure is low. This condition would occur during normal straight-ahead driving when the flow requirements are low. This in turn reduces the horsepower required to drive the pump during high speed cruising operation.

FIG. 3 shows the average pump flow for a power steering pump used currently in vehicles manufactured by Ford Motor Company, Dearborn, Michigan. At 1,200 psi pump pressure, for example, a flow of about 2.85 gallons per minute is achieved. The minimum pump flow specifications are about 1.8 gallons per minute. Both of these values are far in excess of the internal leakage value shown in the lower part of the chart. The difference in these values, which is about 0.97 gallons per minute is the flow that is available for the steering gear when the steering wheel is operated at 60 rpm.

Figure 2:
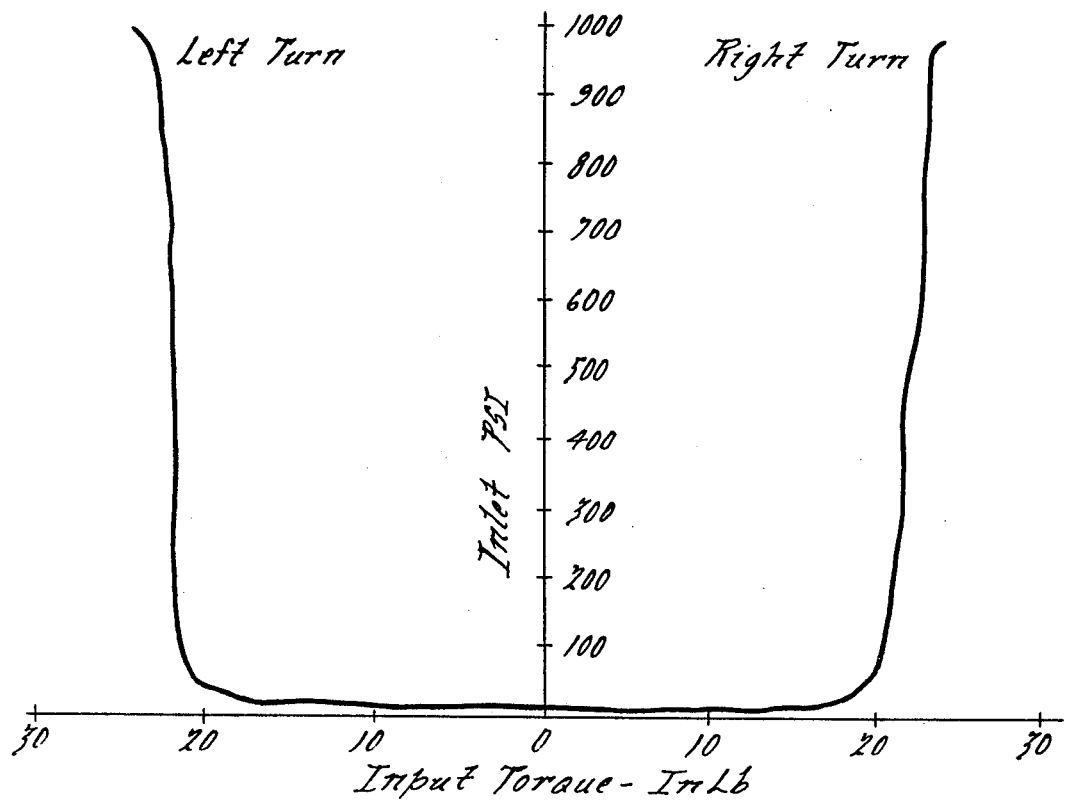
FIG. 2 shows a plot of the relationship between input steering torque applied to the steering gear at pump pressures developed by the power steering pump in the steering system during turning maneuvers.

The chart in FIG. 2 shows the relationship between the input torque applied to the steering wheel and the inlet pressure in passage 18. The left hand side of the chart shows the torques and the pressures for a left turn maneuver. The right hand side of the chart shows the corresponding data for a right turn maneuver. The torque applied to the steering wheel activates the valve which in turn delivers a calibrated flow to the steering gear that is proportional to torque.

Having thus described a preferred embodiment of my invention, what I claim and desire to secure by U.S. Letters Patent is:

1. In a pressure and flow control valve for a power steering system, said system comprising a steering gear adapted to be connected to dirigible vehicle wheels, a power steering pump, a pressure passage extending from said pump to said gear, a pressure and flow control valve situated in and partly defining said passage, a valve chamber forming a part of said valve, a valve spool slidably situated in said valve chamber, a flow restricting orifice situated in said pressure passage, a metering pin carried by said valve spool and registering with said orifice while establishing a controlled flow, spring means normally urging said metering pin to a fixed position relative to said valve spool, said metering pin being movable relative to said valve spool in response to a predetermined pressure buildup in said passage whereby said metering pin is moved from a first operating position to a second operating position, the effective diameter of the portion of the pin in said orifice being smaller when said pin is shifted in response to pressure build up in said pressure passage therby accommodating increased flow under operating conditions that require an increase in pump pressure.

2. In a pressure and flow control valve in a power steering system that comprises a fluid pump, a steering gear and a valve housing, said housing having formed herein a valve chamber, a movable control valve element in said chamber, a high pressure port and a low pressure port communicating with said chamber adjacent one portion of said valve element, said valve element being adapted to control the degree of communication between said high pressure port and said low pressure port, a flow restricting orifice located in one end of said valve chamber, the downstream side of said orifice communicating with the valve chamber at the other end thereof, spring means for biasing said valve element in a direction to complement the pressure force acting thereon, a metering pin slidably carried by said valve element and registering with said orifice, means for establishing two predetermined axial positions of said metering element with respect to said valve element, a relatively large diameter portion of the metering pin registering with said orifice when the pressure is lower than a predetermined value and a smaller diameter portion of said metering pin registering with said orifice upon a pressure increase above said minimum pressure value, said metering pin being responsive to pressure in said passage to shift said metering pin towards the control valve element whereby an increase in flow to said steering gear occurs when the pressure requirements are high and the flow is reduced during normal operation on a straight highway, when decreased operating pressure exists.

3. The combination as set forth in claim 1 including compression spring means located between said metering pin and said valve spool urging said metering pin away from said valve spool to a first operating position and stop means for limiting the relative movement of said pin with respect to said valve spool and establishing said one operating position, said metering pin being moved to a second operating position upon a pressure build-up on the downstream side of said orifice, the effective diameter of the metering pin registering with said orifice being smaller when said metering pin is shifted in response to a pressure build-up.

4. The combination as set forth in claim 2 including compression spring means located between said metering pin and said valve spool urging said metering pin away from said valve spool to a first operating position and stop means for limiting the relative movement of said pin with respect to said valve spool and establishing said one operating position, said metering pin being moved to a second operating position upon a pressure build-up on the downstream side of said orifice, the effective diameter of the metering pin registering with said orifice being smaller when said metering pin is shifted in response to a pressure build-up.

* * * * *